United States Patent [19]

Schafer et al.

[11] Patent Number: 5,595,817

[45] Date of Patent: Jan. 21, 1997

[54] FLAME PENETRATION BLOCKER FOR FUSELAGES

[75] Inventors: Werner Schafer, Birkenau; Gerhard Schaut, Hemsbach, both of Germany

[73] Assignee: Firma Carl Freudenberg, Weinheim, Germany

[21] Appl. No.: 459,079

[22] Filed: Jun. 2, 1995

[30] Foreign Application Priority Data

Jun. 13, 1994 [DE] Germany .................... 44 20 613.5

[51] Int. Cl.⁶ ................................ B32B 5/16
[52] U.S. Cl. .................. 428/283; 428/286; 428/287; 428/920; 428/921; 156/327; 156/329; 427/207.1; 427/248.1
[58] Field of Search .................... 428/283, 286, 428/287, 920, 921; 427/207.1, 248.1; 156/327, 329

[56] References Cited

U.S. PATENT DOCUMENTS 5,079,077  1/1992  Sakayanagi et al. ............. 428/237

FOREIGN PATENT DOCUMENTS 2700608  7/1978  Germany .
1563067  3/1980  United Kingdom .

*Primary Examiner*—Christopher Raimund
*Attorney, Agent, or Firm*—Kenyon & Kenyon

[57] ABSTRACT

A flame penetration blocker for fuselages which is a laminate of a 100 to 600 g/m² mica paper having laminated on one or both sides of it 30 to 300 g/m² needled fabric layers made of flame-retardant fibers. The adhesive effect of the laminate is produced by a partially cross-linked, latently adhesive, temperature resistant binding agent incorporated into the mica paper itself. The laminate is made by adhesive bonding one or both surfaces of a mica paper of the named type with a needled fabric layer under pressure and at a temperature that does not trigger the final cross-linking of the binding agent.

16 Claims, No Drawings

FLAME PENETRATION BLOCKER FOR FUSELAGES

BACKGROUND OF THE INVENTION

1. Field of the Invention

The invention relates to a flame penetration blocker for fuselages and a method for its manufacture.

2. Description of Related Art

In a so-called post crash fire, i.e., upon the impact of aircraft on the ground and development of a fuel fire, the flame penetration time of a fuselage from outside to inside is only 30 to 60 seconds. Moreover, the melting point of the aluminum skin amounts to approximately 640° C.; burning kerosine produces a temperature of over 1000° C.

Presently, there are still no legal regulations which relate to the flame penetration behavior of an aircraft skin.

German patent application 26 05 102 describes a multilayered insulating material consisting of carrier material bonded with a curable or a cured plastic binding agent, mica paper and a cover material on the other side of the mica paper. The stated objective of this patent is to specify a high-temperature resistant insulating material which has an improved processability and winding properties, and in a wound state allows for a uniform full impregnation of a plurality of layers arranged one over another. This is achieved by arranging the binding agent in a pattern formed of points, diamonds or stripes.

Preferably, the addition of the hardener, and therewith the final cross-linking of the pre-crosslinked epoxy resin, is carried out with the following impregnation process. The carrier material is a formed fabric having adhesive substance imprinted in a pattern, which, after the drying, exists in pre-crosslinked state. Onto this, fine mica paper and a cover sheet made of a further formed fabric having corresponding adhesive substance imprint are laid on top of one another, and the entirety is intimately bonded in a heated calender. This version, in which the epoxy resin is still not finally cross-linked, is now wound to form a finished insulating body with hollow spaces, the mica sheets not breaking. This hollow body is penetratingly impregnated with an insulating resin to which is added a curing agent suitable for the binding agent. By this means, the final curing of the epoxy resin pattern-imprinted on the formed fabric is carried out simultaneously during the full impregnation.

In another non-wound version, the plastic binding agent of the insulating material is already cured.

Because of its geometric shape as a wound structure, the first version is not suitable for installation in fuselages. Because of the cured binding agent, the second version is stiff to such an extent that the structural irregularities of fuselages cannot be covered all over.

Therefore, this prior art is not suitable for increasing the flame penetration time of fuselages.

The German patent application 27 00 608 relates to a non-flammable composite insulating material composed of a core sheet A and two covering layers B. The core sheet A contains inorganic conductive particles which are bonded together by 1 to 30% by weight of a temperature resistant, high-molecular binding agent having a lasting service temperature in accordance with DIN 53 446 of more than 100° C. The two covering layers B represent a flat carrier material of inorganic or organic fibers or wires bonded together, which are likewise bonded with 3 to 30% by weight of the named binding agent.

Because of the high content of binding agent in all the layers, such an insulating material is very stiff and is not able to conform all over to contoured opposite surfaces as they exist in large number in the fuselage. The completely cured binding agent is responsible for the stiffness of the composite insulating material.

SUMMARY OF THE INVENTION

The desire of the aircraft industry and the object of the invention is for an increase in the flame penetration time to 3 to 4 minutes in order to increase the opportunity for appropriate rescue measures. This can be carried out in particular with the help of the incorporation of flame penetration blocker layers in the aircraft skin construction, these layers having to be non-rigid and flexible for technical processing reasons in order to be adaptable to the irregularities of the fuselage construction.

These and other objects are met by the present invention which provides a flame penetration blocker for fuselages comprising a laminate of a 100 to 600 g/m$^2$ heavy phlogopite or muscovite mica paper having laminated on at least one side thereof a 30 to 300 g/m$^2$ heavy formed fabric layer composed of flame-retardant fibers which have an LOI of 20 to 55 and are needled together. The mica paper is bonded to the formed fabric layer with a partially cross-linked, latently adhesive binding agent that is a component of the mica paper itself, the binding agent having a lasting service temperature in accordance with DIN 53 446 of more than 100° C. and being present in an amount from 20 to 30% by weight of the mica paper and in an effective adhesive quantity to bond the mica paper to the formed fabric layer.

DETAILED DESCRIPTION OF THE INVENTION

Thus, the flame penetration blocker according to the invention is a multilayered fabric and includes the composite of a 100 to 600 g/m$^2$ heavy mica paper having 30 to 300 g/m$^2$ heavy formed fabric layers bonded to it on one or both sides. At the same time, the formed fabric in each case is composed of flame-retardant fibers which have an LOI of 20 to 55. Such flame-retardant or "difficult to ignite" fibers are described in detail in *Melliand Textilberichte* [*Melliand Textile Reports*] 6/1987, 396 to 401. The report includes numerous organic and inorganic fibrous materials and names their LOI values. This "Limiting-Oxygen-Index" determines the flammability of plastics according to ISO 4589, "Kunststoffe—Bestimmung der Brennbarkeit durch den Oxygen-Index" [Plastics—Determination of Flammability by the Oxygen Index], and, with certain restrictions is also applicable to textiles provided that these consist of organic fibrous materials. Effective flame-retardant behavior is to be expected in our atmosphere at LOI values above approximately 27.

Mica paper is known and consists of the smallest mica sheets which are bonded by means of a binding agent with each other and with the carrier made of paper fibers or textile fibers.

According to the invention, this binding agent is partially cross-linked and still latently adhesive. That is, it consists of a polymer substance which, in an intermediate stage of the polymerization, adhesively bonds the mica sheets among themselves and to the carrier, however, still has adhesive properties before a final cross-linking initiated by the effect of energy.

According to the invention, the binding agent is present in a quantity of 20 to 30% of the weight of the mica paper, and therefore also still acts adhesively on at least one of the surfaces of the mica paper.

Further, this binding agent must have a lasting service temperature in accordance with DIN 53 446 of more than 100° C. in order not to be destroyed first thing in case of the effect of fire.

The indicated adhesion of the partially cross-linked binding agent externally reliably holds fast the 30 to 300 g/m² heavy formed fabric layer on one or both sides respectively of the mica paper.

Of the various types of mica, phlogopite and muscovite have proven to be particularly heat resistant.

Formed fabric fibers which are preferably used consist, for example, of m and p aramide, phenol, oxidized polyacrylonitrile, polybenzimidazole, or melamine.

The coherency of the fibers is assured solely by needling. This can be carried out by needle looms or by high-energy water jets.

The mica paper is then preferably coated or overlaid on both sides with formed fabric if a particularly high sound reduction is desired or if the not very abrasion-proof mica paper layer should be specially protected in the processing of the composite.

The generally known polycondensates, polyester imides, polyamide imides or strongly cross-linked melamine/formaldehyde or phenol/formaldehyde resins represent advantageous, latently adhesive binding agents for the laminates according to the invention, provided they do not fall below the lasting service temperature of 100° C. in accordance with DIN 53 446. Silicone resins are particularly suitable.

The flame-retardant effect of the laminate can even be increased if one side of the mica paper is provided with the formed fabric and the other side with an aluminum coating. This Al-reflection coating will effectively face outwardly with regard to the aircraft skin.

The flame-retardant effect of the formed fabric fibers can be further increased by impregnating the formed fabric, or coating its surfaces with vermiculite, an over-aged mica.

For installation and fixing in the fuselage, the flame penetration blocker composite is advantageously furnished on one or both sides with a self-hardening adhesive whose activation temperature corresponds at least to the final cross-linkage temperature of the indicated binding agent in the laminate.

Examples of such adhesives are specified below.

Within the scope of the invention, it is also possible to appropriately use a self-adhering, active adhesive, its activation of course then not being applicable.

The manufacture of the mica paper is generally known and is carried out by specialty firms. In doing so, in principle a mica pulp is laid down by way of a Fourdrinier™ machine to form mica paper on a carrier. The bonding of the mica particles among themselves and to the carrier, in this case a thin fibrous material, is accomplished by a synthetic resin binder which is partially cross-linked and after that still possesses latently adhesive properties up to the surface areas. Suitable binding agents for this are named in the specification above. The finished mica paper has a mass per unit area of 100 to 600 g/m²; phlogopite or muscovite is selected as mica. The partial cross-linking of the binding agent is carried out by means of heat, data sheets for the respective binding agents furnishing exact particulars.

A flame-retardant formed fabric of the type named at the beginning is now laminated under pressure on one or both sides of the mica paper, the binding agent of the mica paper functioning as the adhesive medium. In so doing, care must just be taken that the acting temperature does not lead to the complete cross-linking of the binding agent. According to the invention, this process may first be carried out upon installation of the laminate in the fuselage.

The fixing of the composite to the fuselage is accomplished preferably by self-hardening adhesive, advisably on a base of silicone, acrylate or epoxy resins, for example, which is applied on one or both sides of the composite.

These adhesives are activated during processing in the heat; the requisite heat action, which likewise can be gathered from appropriate data sheets, initiates at the same time not only the bonding to the skin of the aircraft, but also the final cross-linking of the binding agent which assures the coherency of the flame penetration blocker, if one chooses in such a way that the temperature necessary for the activation is greater or the same as the final cross-linking temperature of the binding agent.

In the event that the composite is furnished on one or both sides with a self-adhering adhesive, naturally these temperature stipulations do not apply. This adhesive just must not be destructible by the activation heat.

In the case of a two-layer version of the flame penetration blocker according to the invention, after the coating of the mica paper with the formed fabric, it is advantageous to vapour-deposit the free surface of the mica paper layer with an aluminum coating. This can be carried out, for instance, by sputtering.

The formed fabric can be developed to be even more flame-proof, i.e., lengthen the flame penetration time, if, before laminating, it is impregnated, or its surfaces are coated with a vermiculite suspension. In so doing, roughly 100 percent vermiculite is used, relative to the weight of the formed fabric. A formed fabric impregnated in such a manner then already fulfills alone the requirements with regard to behavior in fire in accordance with DIN 5510, class S 5, as well as in accordance with FAR 25.853 b.

Because of its construction according to the invention, the flame penetration blocker assures a flexibility advantageous for the processing in the fuselage, irregularities being able to be covered without difficulty. Particularly in the case of the three-layer versions of the flame penetration blocker, it is quite possible to compensate for irregularities contingent on structural engineering in the surfaces to be processed.

In principle, two possibilities for processing are given:
1. The sticking of the flame penetration blocker composite directly onto the inner side of the metallic skin of the fuselage. In so doing, in the case of two-layer laminates, the mica side should be arranged against the aluminum.
2. The sticking on the side wall of the aircraft cabin as a component of the secondary insulation present there in any case. On it, the standard insulation, mineral wool for instance, can then be applied.

The formed fabric of the laminate according to the invention also contributes to an improvement in the sound deadening effect of the skin. However, the principal advantage is that the behavior in fire is improved to such an extent that the flame penetration time amounts to at least three minutes.

What is claimed is:

1. A flame penetration blocker for fuselages comprising a composite of a 100 to 600 g/m² phlogopite or muscovite mica paper having laminated on at least one side thereof a 30 to 300 g/m² needled fabric layer composed of flame retardant fibers which have an LOI value of 20 to 55, the mica paper being bonded to the needled fabric layer with a partially cross-linked, latently adhesive binding agent that is a component of the mica paper itself, the binding agent having a lasting service temperature in accordance with DIN 53 446 of more than 100° C. wherein the binding agent is incorporated into the mica paper in an amount from 20 to 30% by weight of the mica paper.

2. The flame penetration blocker according to claim 1, wherein the composite further comprises, on at least one side thereof, a self-hardening adhesive capable of being activated by heat at at least the final cross-linking temperature of the binding agent.

3. The flame penetration blocker according to claim 1, wherein the latently adhesive binding agent is a polycondensate, a polyester imide, a polyamide imide, a cross-linked melamine/formaldehyde resin, a cross-linked phenol/formaldehyde resin or a silicone resin.

4. The flame penetration blocker according to claim 2, wherein the latently adhesive binding agent is a polycondensate, a polyester imide, a polyamide imide, a cross-linked melamine/formaldehyde resin, a cross-linked phenol/formaldehyde resin or a silicone resin.

5. The flame penetration blocker according to claim 1, wherein the mica paper has a surface having an aluminum coating.

6. The flame penetration blocker according to claim 2, wherein the mica paper has a surface having an aluminum coating.

7. The flame penetration blocker according to claim 3, wherein the mica paper has a surface having an aluminum coating.

8. The flame penetration blocker according to claim 1, wherein the needled fabric is impregnated and is coated on its surfaces with vermiculite.

9. The flame penetration blocker according to claim 2, wherein the needled fabric is impregnated and is coated on its surfaces with vermiculite.

10. The flame penetration blocker according to claim 3, wherein the needled fabric is impregnated and is coated on its surfaces with vermiculite.

11. The flame penetration blocker according to claim 5, wherein the needled fabric is impregnated and is coated on its surfaces with vermiculite.

12. The flame penetration blocker according to claim 6, wherein the needled fabric is impregnated and is coated on its surfaces with vermiculite.

13. A method for manufacturing a flame penetration blocker for fuselages comprising the steps of:

forming a mica paper having a mass per unit area of 100 to 600 g/m$^2$ from phlogopite or muscovite, by bonding together mica particles with a partially cross-linked synthetic resin binding agent which is latently adhesive on its surfaces and not finally cross-linked, the binding agent being used in a quantity of 20 to 30% of the mica paper weight and being characterized by a lasting service temperature in accordance with DIN 53 446 of more than 100° C., bonding at least one side of the mica paper to a 30 to 300 g/m$^2$ heavy, needled formed fabric made of flame-retardant fibers having an LOI of 20 to 55, using the adhesive effect of the binding agent, with pressure and a temperature which does not result in further cross-linking of the binding agent.

14. The method according to claim 13, wherein after bonding the mica paper on one side thereof with the formed fabric, an opposite side of the mica paper is vapour-deposited with an aluminum coating.

15. The method according to claim 13, further comprising the steps of impregnating or coating the formed fabric on both sides thereof with an aqueous suspension of vermiculite and subsequently draining off the suspending agent, before attaching the mica paper to the formed fabric.

16. The method according to claim 14, further comprising the steps of impregnating or coating the formed fabric on both sides thereof with an aqueous suspension of vermiculite and subsequently draining off the suspending agent, before attaching the mica paper to the formed fabric.

\* \* \* \* \*